United States Patent [19]

Wirtz

[11] Patent Number: 5,802,200

[45] Date of Patent: Sep. 1, 1998

[54] METHOD FOR DETERMINING A REFERENCE AUTOGRAPH CHARACTER STRING ON THE BASIS OF A SET OF SAMPLE AUTOGRAPH CHARACTER STRINGS FROM THE SAME WRITER

[75] Inventor: Brigitte Wirtz, Holzkirchen, Germany

[73] Assignee: Siemens Aktiengesellschaft, Munich, Germany

[21] Appl. No.: 615,051

[22] Filed: Mar. 12, 1996

[30] Foreign Application Priority Data

Mar. 29, 1995 [DE] Germany .................. 195 11 470.1

[51] Int. Cl.$^6$ ....................................................... G06K 9/00
[52] U.S. Cl. ........................... 382/119; 382/120; 382/187
[58] Field of Search ........................... 382/119–123, 187

[56] References Cited

U.S. PATENT DOCUMENTS

| | | | |
|---|---|---|---|
| 4,128,829 | 12/1978 | Herbst et al. | 382/120 |
| 5,040,222 | 8/1991 | Muroya | 382/123 |
| 5,054,088 | 10/1991 | Gunderson et al. | 382/120 |
| 5,111,512 | 5/1992 | Fan et al. | 382/122 |
| 5,454,046 | 9/1995 | Carman, II | 382/187 |
| 5,553,156 | 9/1996 | Obata et al. | 382/157 |
| 5,577,135 | 11/1996 | Grajski et al. | 382/187 |

FOREIGN PATENT DOCUMENTS

| | | |
|---|---|---|
| 28 55 863 | 12/1979 | Germany . |
| 38 22 671 C2 | 11/1990 | Germany . |

OTHER PUBLICATIONS

"Automatic Signature Verification and Writer Identification—The State of the Art", Plamondon et al, Pattern Recognition, vol. 22, No. 2, pp. 107–131, 1989.

Yoshimura et al Signature Verification Incorporating Pen Movement, pp. 2085–2093—IEICE Transactions, vol. E 74 No. 7 Jul. 1991.

The Use Of A One–Stage Dynamic Programming Algorithm for Connected Word Recognition, IEEE Transactions On Acoustics, Speech, And Signal Processing, vol., ASSP, 32 No. 2, Apr. 1984.

Online Signature Verification Based On Shape, Motion, and Writing Pressure, Sato et al.,1982 IEEE pp. 823–827.

*Primary Examiner*—Leo Boudreau
*Assistant Examiner*—Bhavesh Mehta
*Attorney, Agent, or Firm*—Hill & Simpson

[57] ABSTRACT

In a method for determining a reference autograph character string on the basis of a set of sample autograph character strings from the same writer, a particularly characteristic autograph character string can be selected from a set of produced sample autograph character strings, e.g. signatures. In signature verification, such references are needed to serve as a comparison measure in the identification of the signer. The method according to the invention divides the produced character strings of a sample set of signatures into strokes according to the execution, and compares individual strokes with respect to the recorded dynamic parameters, such as for example pressure and locus coordinates and writing speed, in order to enable the determination of the deviation of all the strokes of the sample character strings from one another. From the set of sample character strings, that string is then selected as the reference character string which comprises the smallest values to the totality of all other sample character strings. In this way it is ensured that the most representative sample character string is brought into use as the reference character string.

8 Claims, 2 Drawing Sheets

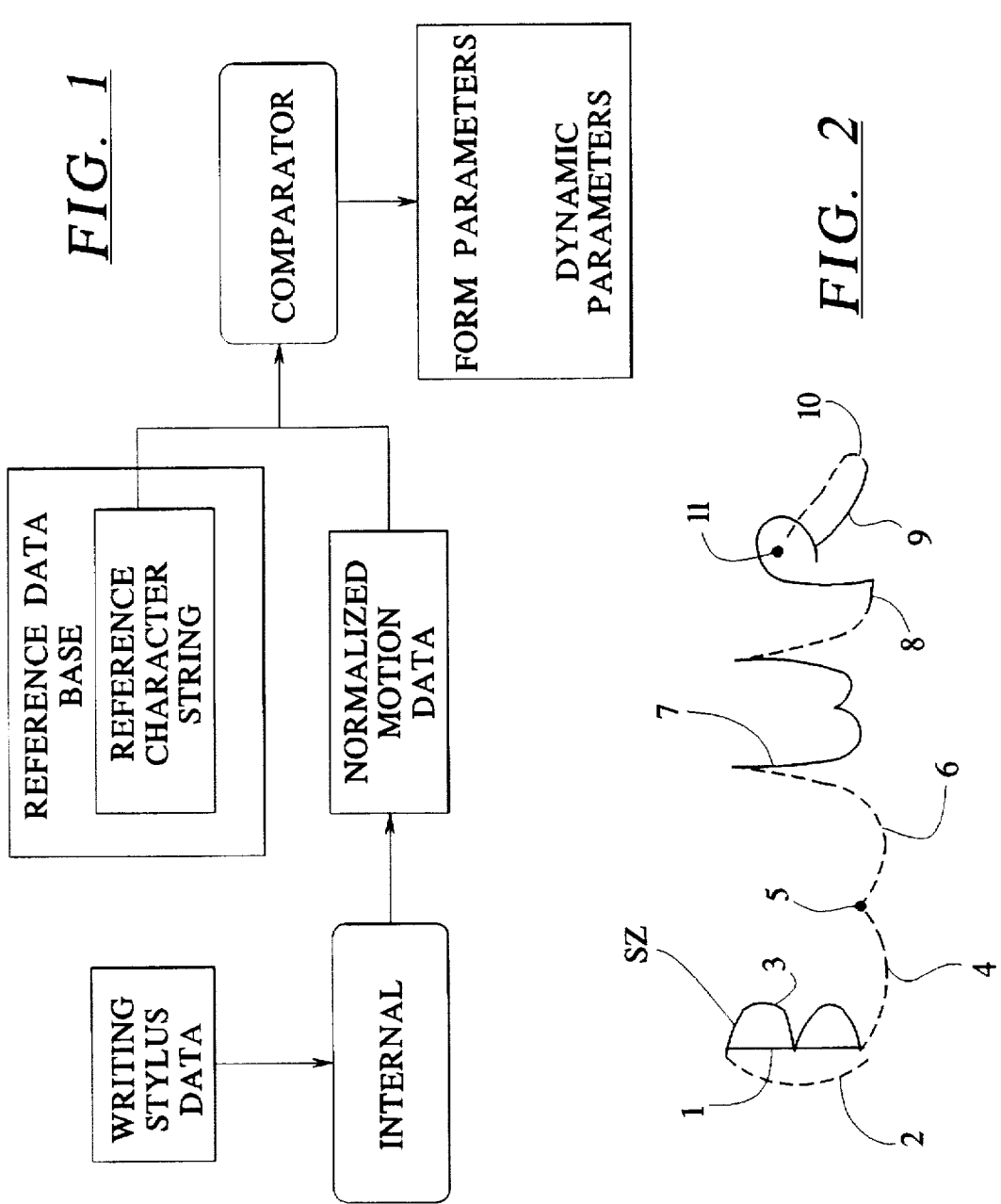

METHOD FOR DETERMINING A REFERENCE AUTOGRAPH CHARACTER STRING ON THE BASIS OF A SET OF SAMPLE AUTOGRAPH CHARACTER STRINGS FROM THE SAME WRITER

BACKGROUND OF THE INVENTION

Alongside technologies such as password or smart card methods, so-called biometric methods for verification of identity and authentification are coming increasingly into use. Signature verification is one such biometric method in which the user identifies himself by means of his signature. Particularly in dynamic handwriting verification, it is assumed that the dynamic characteristics are specific to the signer, sufficiently stable and repeatable, and impossible or difficult for a forger to reproduce.

The handwritten character string as a means for automatic personal identification has considerable advantages. The signature is an "ID code" that is unique to its owner throughout life, can be reproduced at any time, and will not be forgotten. R. Plamondon, G. Lorette, Automatic Signature Verification And Writer Identification—State Of he Art, Pattern Recognition, Vol. 22, No. 2, 1989, pp. 107–131, gives an overview of the state of the art and the literature on signature verification and writer identification.

An identity number thereby serves e.g. for the identification or selection of the necessary references.

However, the signing process does not always yield identical signatures, either with respect to the static or to the dynamic characteristics. Variations in a writer's way of writing causes geometric disturbances such as translation, rotation and even absence of segments of the signature.

On-line systems for handwriting verification require a device with which the temporal sequence of stylus positions, and possibly also other signals such as speed, acceleration or stylus motions, can be recorded during the writing process and thus brought to bear in verification.

SUMMARY OF THE INVENTION

An object of the invention is to indicate an improved method for determining a reference autograph character string on the basis of a set of sample autograph character strings.

According to the invention, a method is provided for determining at least one reference autograph character string as a reference set based on a sample set of sample autograph character strings from a same writer. Through a writing by hand of a predetermined text, at least three sample character strings are produced by a same writer for formation of the sample set. During the production of the sample character strings using a stylus, characteristic dynamic parameters describing motion of the stylus are recorded and retained. Differences in the dynamic parameters between a respective sample character string and all sample character strings from the sample set not as yet taken into account in the determination are determined and retained per dynamic parameter as a parameter deviation. That sample character string is determined as said at least one reference character string for the reference set which comprises a smallest parameter deviation from all other sample character strings with respect to all dynamic parameters.

A particular advantage of the method according to the invention is that a high recognition rate can be achieved even without a large reference set, i.e. plurality of sample character strings, because through the method of the invention, that sample character string is selected which is the most representative of the character strings produced. The method of the invention can be used to particular advantage in the verification of signatures for the identification of the person who produced the signature.

Preferably, with the method of the invention that character string is chosen as a reference character string which comprises the smallest parameter deviations in all its parameters to all other sample character strings of the reference set. In this way it is ensured that this character string also comprises the smallest parameter deviations from the future possible sample character strings to be produced and verified.

It is particularly advantageous that with the method of the invention, the produced sample character strings of the reference set are divided into strokes, whereby it is distinguished whether during the signing on the writing surface the stylus is led so as to write, or is lifted from the document. In this way an additional stroke datum is obtained, with which the individual parts of the sample character strings can be better analyzed with regard to their motion parameters and the associated deviations. In this way an even more representative and reliable reference character string is obtained. In stroke-based comparisons, the method of dynamic programming is preferably employed, in order to enable the assimilation of time-dependent differences in the motion parameters during the production of the signature. Hermann Ney, the use of a One-Stage Dynamic Programming algorithm for Connected Word Recognition, IEEE Transactions on Accoustrics Speech, and Signal Processing, Vol. ASSP-32, NO. 2, April 84, pp. 263–271.

Advantageously, in the inventive method the individually acquired dynamic parameters are weighted with different weighting factors; in this way person-specific characteristics in the production of the individual sample character strings can be better incorporated, and the differences that appear can be leveled out.

In the method of the invention it is particularly advantageous that the locus coordinates of the sample character string, as well as the pressure used in the writing of the signature and the writing speed, are used as motion parameters.

Advantageously, in the method of the invention, weighting factors are assigned for the individual strokes of the sample character strings in dependence on how well these strokes are reproducible within the reference set. In this way it is advantageously ensured that those strokes that are best reproduced are also more heavily weighted in the verification of a character string, thus ensuring a higher recognition rate for a verification method.

Advantageously, through the method of the invention for the weighting of the individual strokes, different weighting factors can be formed in dependence on the characteristics of the sample character strings produced, on the one hand from the standard deviation and on the other hand from the mean value of the produced sample character strings in the reference set.

Advantageously, the process of the invention is calculated in the form of matrices, whereby a matrix contains a form factor composed of the distances from the individual strokes of the respective sample character string under consideration to all other sample character strings. The distances are thus calculated by means of dynamic programming. A further matrix is represented for a motion factor, which essentially corresponds to the surface under the warp function for the character string under consideration.

Advantageously, the method of the invention may also be used for several reference character strings, e.g. in case someone signs with his initials or with his full name, and this is to be allowed by the verification method. Through the method of the invention, the similarities of the sample character strings respectively under consideration to the respective other sample character strings are then determined, and groups are formed with regard to the associated determined parameter deviation.

Preferably, in the method of the invention the reference character string is prepared in a particular way. The weighting of the individual strokes contained in the reference character string according to their accuracy of reproduction in a set of sample signatures enables the additional weighting of determined characteristic features of a character string according to their significance and their reproducibility, so that a present reference character string can count as particularly representative.

Preferably, in the method of the invention a single reference character string is chosen from a set of sample character strings as particularly advantageous. His characteristic string comprises the smallest differences, with respect to the set of motion parameters to be verified, from the rest of the sample character strings produced as references.

An important advantage of the method of the invention is that in contrast to the prior art, more features of the reference character string are exploited. Y. Sato, K. Kogure, Online signature verification based on shape, motion, and writing pressure, Proc. 6th Int. Conf. On Pattern Recognition, Vol. 2, 1982, pp. 823–826. Thus, the stroke information, i.e. the information concerning the guiding of the stylus over the writing surface and in its lifted-off state, which divides the signature into segments, is advantageously incorporated into the method. In this way an improved allocation of the locational dependencies in signatures to be compared can be carried out.

Advantageously, this fact is taken into account in the invention by choosing a cost function for the distance calculation of the dynamic programming in such a way that this function combines locus parameters, and e.g., pressure and speed parameters. The warp function generated by the dynamic programming can thus be forced into the interval limits predetermined by the individual strokes.

Advantageously, the factors combined in the cost function can be weighted with other factors in order to take into account the effects of the individual motion parameters on the writing process.

Advantageously, in the method of the invention the pressure used in writing is selected as one of the motion parameters. In this way the stroke information can be obtained via the pressure information.

Preferably, in the method of the invention the writing speed is selected as a parameter of the cost function for the dynamic programming, since in this way the person-specific motor characteristic in the writing process can be taken into account particularly well.

BRIEF DESCRIPTION OF THE DRAWINGS

FIG. 1 shows an arrangement for acquiring motion data during handwriting;.

FIG. 2 shows a reference character string, divided into strokes; and

DESCRIPTION OF THE PREFERRED EMBODIMENTS

Figure 3A:
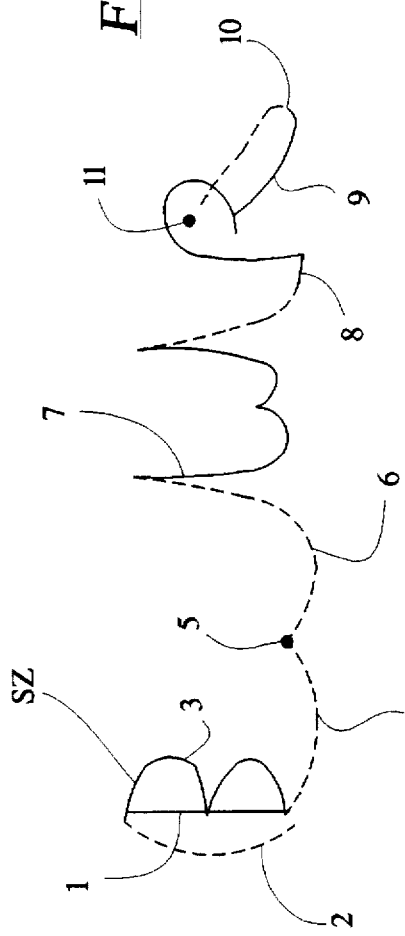
FIG. 3 illustrates the selection of a reference character string.

In FIG. 1, an arrangement for handwriting verification and for recording dynamic parameters during handwriting is represented. Handwriting verification, and in particular signature verification, are processes for which the method of the invention for determining a reference character string is particularly well suited, since a good reference character string leads to a higher recognition rate during verification.

The data BEW of a writing stylus are, for example, acquired via a tablet by means of an input stylus and normalized in a further interval N, so that further normalized motion data NBEW are processed. These normalized motion data NBEW are compared with a reference sample or a reference character string REF, which is contained e.g. in a reference data base RDB, having been determined according to the method of the invention, the comparison taking place in a comparator VER. By means e.g. of dynamic programming, through the comparison of the two character strings the verification measures for the agreement of the form parameters MFORM and the dynamic parameters MDYN are obtained.

Signature verification systems generally contain e.g. components for data recording, pre-processing, feature extraction and for the comparison process.

The input data are recorded by means of a sensor (tablet). They are normalized e.g. before or during the comparison with the sample. If a user inputs a character string together with his identification number, the inputted character string is compared with his reference data. The identification number thus serves e.g. for locating the correct reference set, obtained from the signals of one or several reference signatures.

A verification system must e.g. on the one hand allow for the variability within a class, while at the same time detecting significant differences between the classes (i.e. genuine vs. forgery). The method of determination of reference samples thus plays an important role.

In the first place, the question arises of how the test sample is to be generated from the output data. Here the most characteristic/most discriminating features of a character string must form the basis, independent of the specific approach employed.

If data from only one reference character string per person are allowed in the data base, genuine signatures that vary too much from this reference will be rejected along with forgeries. In the ideal case, for each subscriber the set would have to be determined by means of characteristic character strings, e.g. signatures, from a sufficiently large test set, and the validity of a signature produced at a later time as a sample character string would be verified by comparison with each of these reference signatures or a combination of them. The size of the reference set should here be, e.g., adaptively determined according to the variability of the writer, and the reference set itself should be e.g. continually updated.

For this reason, the use of dynamic signature verification is based on the interpretation of the signing process as a ballistic motion, i.e. a rapid motion without sensor-manipulator feedback, whose dynamics distinguish the original from the forgery. Because of the unreproducible dynamic of the musculature, it is the dynamics characteristics that are most specific for the signer.

During verification, the output data are not directly comparable. The location of the beginning of a signature, for example, is not the same every time: signatures are of different sizes; the orientation of the writing with respect to the writing surface changes; and the time needed for writing is variable. In order to ensure that recognition is independent of writing size, writing placement, degree of writing rotation, etc., the signals must be normalized before verification, or invariant verification methods must be used with respect to these characteristics.

The normalization of the sample character strings should preferably also be carried out according to the method of the invention, in order to enable a better determination of characteristic parameters and to enable a precise determination of the parameter deviations between the respective motion parameters.

The method of the invention is based on the idea that the suitable reference character string is not that sample character string that comprises a minimal deviation from one or several sample character strings with regard to one or several motion parameters. Rather, according to the invention the sample character string that is particularly suited to be the reference character string is that character string that comprises the smallest deviation in all dynamic parameters from all sample character strings per examined parameter. By means of the procedure of the invention, in practice that sample character string is calculated which is the most similar to all the others, and thus best corresponds to a representative way of writing. In case several reference character strings are produced and desired, the reference set may analogously be divided into two or more subsets. However, a reference character string may also, for example, be created artificially by forming a mean value from the acquired motion parameters per time interval and per sample character string over the entire reference set.

During verification the complete signature signal is e.g. regarded as a parametric or complex time function whose sampled values form the features. The signals are obtained directly via corresponding sensors or indirectly through calculation from the stylus data (e.g.: position: the sequence of the (x(t),y(t)) coordinates at discrete time points corresponding to the sample rate of a pen tablet; sequence of stylus liftings/lowerings; pressure: the sequence of the p(t) signals; force: the motor force used during the writing process; speed: the sequence of the v(t) signals, etc.).

Handwriting verification is thus traceable to the comparison of functions. Standard approaches to this can be found in the literature. Herman Ney, Supra, M. Yoshimura, Y. Kato, S. Matsuda, I. Yashimura, On-line signature verification incorporating the direction of pen movement, IEICE transactions, 1991, Vol. E74, No. 7, pp. 2083–2091. In particular, recourse can be had to experience with such approaches in the field of speech processing.

FIG. 2 shows a character string SZ to be verified. This character string represents e.g. a signature and is divided into individual strokes 1 to 11. Here it should be noted that the strokes can be divided into two partial classes: the near-strokes, i.e. strokes that are not written, and the writing strokes, i.e. strokes in which the stylus touches the paper or the writing surface. The near-strokes are represented in FIG. 2 by broken lines, and are numbered below the character string SZ with the numbers 2, 4, 6, 8, 10. The writing strokes are represented by solid lines and are marked with odd numbers. Through the acquisition of strokes and the comparison of these strokes in the method of the invention, the advantage is realized that each character string produced can be divided into different partial sections, which can subsequently be used, together with corresponding partial character strings of the other sample character strings from the reference set, in the determination of the reference character string for the calculation of the parameter deviation. In a later handwriting verification using a reference character string determined according to the invention, error is reduced in dynamic programming in the locus allocation of the individual points with regard to the individually acquired motion parameters.

The dynamic parameters for a writing stylus, obtained e.g. by means of a WACOM tablet (PL-100V), yield information about stylus liftings and lowerings, temporal position and pressure signals, and a sequence of sampling time points. All data are acquired, independent of whether this takes place in the vicinity of or on the tablet.

FIG. 2 further shows the position signal curve for a signature. The output signal of length n, having e.g. the form $$[PenUp/PenDown, x(t), y(t), p(t), t] \tag{1}$$

is normalized before further processing (verification or reference formation) with regard to time, position (translation and rotation in the tablet plane) and size, according to the method of Sato & Kogure, supra. It should be noted that here the horizontal writing motion contained in the x(t) signals must be eliminated, so that the time warping can also be applied to these signals.

For verification, stylus signals of different lengths are now non-linearly compared by means of dynamic time warping—the non-linear correlation of two time signals through the use of dynamic programming (DP). Let $$A = a_1, a_2, \ldots, a_i, \ldots, a_I \text{ and}$$
$$B = b_1, b_2, \ldots, b_j, \ldots, b_J \tag{2}$$

be two time signals (signature signals) of different lengths. Then the sought after non-linear correlation of these signals is a sequence of index pairs of the form $$W = (w(1), w(2), \ldots, w(K)), \text{ with} \tag{3}$$

$$w(1) = (1,1), w(k) = (i(k), j(k)), w(K) = (I, J), \tag{4}$$

K length of the warp thread. W implements a mapping of the time axis of the one signal onto that of the other signal and is thus designated as a warping function. If no time differences existed between the two signals, W would be the diagonal between the points (1,1) and (I,J). Let the local distance between two feature vectors $a_i$ and $b_j$ to the time points I or j be $$d(W) = d(a_i, b_j) = d(i,j) = \|a_i - b_j\|, \tag{5}$$

(Euclidean distance or absolute difference); then $$D(A,B) = \min_{W} \left[ \frac{\sum_{k=1}^{K} d(w(k)) * c(k)}{\sum_{k=1}^{K} c(k)} \right] \tag{6}$$

c(k) positive weighting function of the local distance $$d(w(k)) = d(ai, bj) \tag{7 and}$$

$$\sum_{k=1}^{K} c(k)$$

normalization for the length of the warp path the global minimal time-normalized distance between the two signals A and B. Under the assumption that the weighting functions c(k) are independent of the warp function W, we have:

$$D(A,B) = \frac{1}{\sum_{k=1}^{K} c(k)} \min_W \left[ \sum_{k=1}^{K} d(w(k)) \cdot c(k) \right] = \quad (8)$$

$$\frac{1}{N} \min_W \left[ \sum_{k=1}^{K} d(w(k)) \cdot c(k) \right]$$

The structural characteristics of temporal signature signals lead to the following global conditions on the warping function W:

Monotonicity: $i(k-1) \leq i(k)$ and $j(k-1) \leq j(k)$ (9)

Continuity: $i(k)-i(k-1) \leq 1$ and $j(k)-j(k-1) \leq 1$ (10)

and thereby $$w(k-1) = \begin{cases} i(k), j(k) - 1 \\ i(k) - 1, j(k) - 1 \\ i(k) - 1, j(k) \end{cases} \quad (11)$$

In contrast to the case of speech recognition, in signature recognition a pseudo-asymmetrical form $(D(A,B) \neq D(B,A))$ of the weighting factors should preferably be used. The following thus results:

$c(k)=1$ for all $k=1 \ldots K$ (12)

$N=I$ (13)

and as the central DP equation (without slope limit):

$$g(i,j) = \min \begin{bmatrix} g(i,j-1) + d(i,j) \\ g(i-1,j-1) + d(i,j) \\ g(i-1,j) + d(i,j) \end{bmatrix} = \quad (14)$$

$$d(i,j) + \min \begin{bmatrix} g(i,j-1) \\ g(i-1,j-1) \\ g(i-1,j) \end{bmatrix}$$

and with the overall quality for the allocation of A to B $$D(A,B) = (1/N) g(I,J). \quad (15)$$

FIG. 3 illustrates the method of the invention on the basis of several different sample character strings.

Figure 3B:
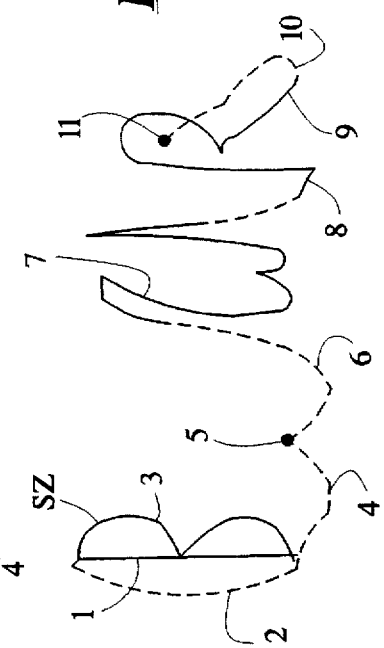
Figure 3C:
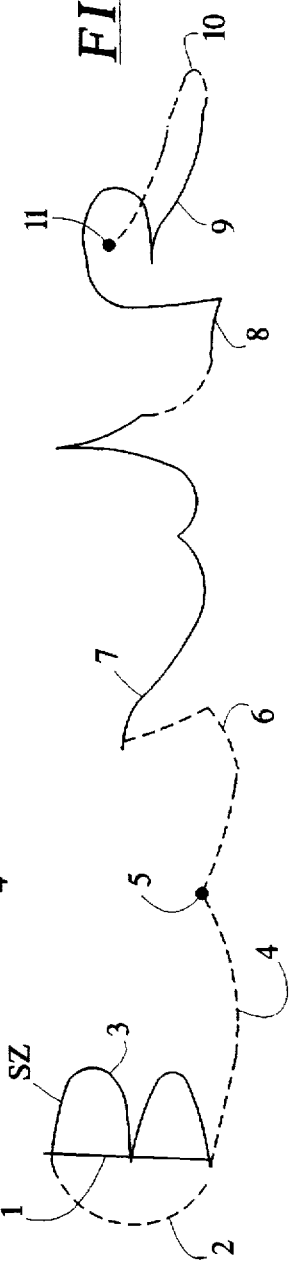

There are shown three different sample character strings of the character string from FIG. 2. In FIG. 3a the sample character string described in FIG. 2 is represented in a smaller scale. FIG. 3b shows the character string SZ compressed and with a larger height. FIG. 3c shows the character string SZ broader and not as high as in the original in FIG. 2.

The FIGS. 3a to 3c are meant to symbolize that a produced signature or a sample character string can vary even for the individual writer. The described differences between the individual partial figures are leveled out using a standard method, by means of a normalization with regard to the x- and y-direction. For this reason, as a rule a normalization will be carried out before a comparison, in a standard verification method. However, FIGS. 3a to 3c comprise still another difference. Here, attention is especially to be drawn to stroke 7, which concerns the letter W of the produced signature, or the sample character string. In FIG. 3b, stroke 7 is inclined to the right, while in FIG. 3c stroke 7 is inclined sharply to the left. For the sake of simplicity, here only the locus coordinates in dependence upon time are represented. It would also be quite possible to represent other acquired motion parameters of the sample character string in a diagram in a stroke-dependent manner and to analyze them in a way analogous to the method here described. If, for example, a reference character string were now to have to be selected according to the method of the invention from the character strings in FIGS. 3a to 3c, the reference set would subsequently be analyzed in strokewise fashion, and for stroke 7 it would be determined that differences are present with regard to the locus coordinates of the character string as a dynamic parameter. As an approximation, it can be said that the character string in FIG. 3a lies exactly between the character string in FIGS. 3b and 3c with regard to its deviation in inclination, provided that these are normalized before the comparison.

In this case, the sample character string from FIG. 3a would thus be selected as a reference character string from a reference set formed from the character strings in FIGS. 3a to 3c. With regard to its parameter deviation in stroke 7, which presents the only difference in the character strings under consideration here, it comprises on the whole the smallest overall deviation from the character string in FIG. 3b and from the character string in FIG. 3c. It can thus be considered to be the most representative character string from the reference set under consideration, and is stored as a reference character string for use in the verification of this character string for the identification of the signer. Through the method of the invention, in this way a high quality of the reference character strings is ensured in a particularly simple way.

However, other methods that enable the determination of a suitable reference character string from a reference set are also conceivable. For example, it would be conceivable to divide the acquired dynamic parameters into groups in strokewise fashion. Since as a rule the dynamic parameters are acquired in time intervals, a mean value can now be formed for each time interval with regard to an observed motion parameter and the respective stroke to be compared, in order to generate artificially a reference signature or, a reference character string, which represents so to speak an intersection of all the sample character strings produced.

Different possibilities for determining reference samples are known from the literature. The method of the invention takes another path.

Let REF={REF$_1$, . . . , REF$_n$} be a partial set of original signatures of the writer I.

There then results the one reference signature of the writer I as the signature containing the smallest measure M$_{Form}$ in a mapping onto all other signatures from this set, i.e. whose form and dynamics are the most similar to all the original signatures.

Let $$\text{Form} = \begin{bmatrix} m\_form_{11} & m\_form_{12} & m\_form_{1n} \\ m\_form_{21} & & \\ & & \\ m\_form_{n1} & & m\_form_{nn} \end{bmatrix} \quad (51)$$

and $$\text{Bewegung} = \begin{bmatrix} m\_bewe_{11} & m\_bewe_{12} & m\_bewe_{1n} \\ m\_bewe_{21} & & \\ & & \\ m\_bewe_{n1} & & m\_bewe_{nn} \end{bmatrix} \quad (52)$$

be the (nxn) - matrices of the form and motion measures, determined using the method of the invention, of all REF$_j$ having $REF_j$, i,j=1 ..n. (These are matrices having diagonal 0, the lower triangle matrix being formed from the upper one respectively through mirroring about the diagonals.)

[MIN,index]=min (sum((Form.*Form).*(Bewegung.*Bewegung))) (5)

(where.* denotes element-element multiplication)
Then $REF_{index}$ is the sought after reference signature.

$$Ref=\{O_{index}\} \quad (56)$$

If one of the parameters form or motion is too variable for a specific writer, equation (53) may be applied to the respectively stable parameter depending on the case, the stable parameter then also being used in a verification of the character string.

The determination of the reference character string, or of several reference character strings, represents a critical point in verification. If, for example, a reference character string is determined from a set of very similar sample character strings (as is the case when the selected set of reference character strings consists of signatures produced rapidly one after the other), this may possibly fail to be counterbalanced by the natural variability in the signatures of a writer, which will appear only a short time later. On the other hand, if very "bad" original signatures are included in the reference formation process, this can significantly worsen the discrimination between forgeries and originals. It is thus preferable to base the reference formation on sample character strings from several days.

It should be noted here that the generalization powers of the method of the invention on the one hand and its discrimination on the other are so high that the very good results (improvement by a factor of about 5 for skilled forgeries in comparison to Sato & Kogure, supra,) were achieved with only one reference character string, which was determined from a reference set of only 5 signatures, produced one immediately after the other. Experiments have shown that the verification rates do not deviate significantly from one another even under random selection of a reference signature. This is particularly important during the registering phase of a new user in an identification system, since at that time there are still not enough sample character strings available, e.g. for the adjustment of the reference signature.

However, $REF_{index}$ is a good representative of the original signatures produced only if these are sufficiently similar. If a user has for example two characteristic ways of signing, e.g. signature and initials, and this is to be explicitly allowed, or if the user has a relatively high variability that can be better covered by several reference signatures, it is advisable to work with at least two reference signatures. The proposed method for the determination of two reference signatures covers both cases, and in these cases determines two reference signatures as follows:

Let $REF_{index}=REF_1$ be the desired first reference signature having the characteristic that it is the most similar to the entirety of a group in the reference set having small values with regard to $O_{Ref1}$.
Now let:

$$O_{Min}=\{O_i\}, I\epsilon[1,\ldots,n] \quad (55)$$

be the partial set of the original signatures having small values with regard to $O_{Ref1}$.

$$O_{Max}=\{O_i\}, I\epsilon[1,\ldots,n] \quad (56)$$

be the partial set of the original signatures having large values with regard to $O_{Ref1}$, and $$O_{Mean}=\{O_i\}, I\epsilon[1,\ldots,n] \quad (57)$$

be the partial set of the original signatures having medium values with regard to $O_{Ref1}$.

If the original set of sample character strings or original signatures is now distributed into the sets $O_{Min}$ and $O_{Max}$, this means that the signature of the respective writer is identified by two variants, whereby the size of the sets reflects information about the relation to the way of writing. On the other hand, if all or almost all signatures fall into the set $O_{Mean}$, this means that the original signatures can all be described by a reference $REF_{index}$, since they are sufficiently similar to one another. Signatures that do not fall into the set $O_{Mean}$ are in this case to be regarded as mavericks. The numbers $\|O_{Min}\|$, $\|O_{Max}\|$ or $\|O_{Mean}\|$, from which they are to be seen as significant, depend on the number n of the original signatures. Thus, if $$\|O_{Min}\|\epsilon\left[\lfloor\frac{n}{2}\rfloor\pm\frac{num}{2}\right]^{\wedge}\|O_{Max}\|\epsilon\left[\lfloor\frac{n}{2}\rfloor\pm\frac{num}{2}\right], \quad (58)$$

$$num = f(n)$$

then the set of original signatures is better represented by two reference signatures, and index 2 is the index of the original signature that is most similar to all the ones from this group.

$$O_{Ref2}=O_{index2}, \text{ and thus} \quad (60)$$

$$Ref=\{O_{Ref1}, O_{Ref2}\} \quad (61)$$

The method can be generalized to m<<n reference signatures, by using a simple cluster method to determine the groups relative to the indexes determined according to equation (53). Here attention must be paid to the fact that m must be small in relation to n, since otherwise sufficient representatives for the individual groups/variants are no longer available.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for determining at least one reference autograph character string as a reference set based on a sample set of sample autograph character strings from a same writer, comprising the steps of:

through a writing by hand of a predetermined text, producing at least three sample character strings by a same writer for formation of the sample set;

during the production of the sample character strings using a stylus, recording and retaining characteristic dynamic parameters describing motion of the stylus;

on the basis of the dynamic parameters, and in dependence on whether the stylus is pressed against a writing surface or not, decomposing each sample character string into at least a first and a second partial character string in the form of a first and a second stroke;

normalizing the dynamic parameters of all the character strings;

determining and retaining differences in the dynamic parameters between a respective sample character string and all sample character strings from the sample set not as yet taken into account in the determination for each dynamic parameter as a parameter deviation;

carrying out the determining and retaining of the differences in the dynamic parameters strokewise such that strokes are compared via dynamic programming;

determining that sample character string as said at least one reference character string for the reference set which comprises a smallest parameter deviation from all other sample character strings with respect to all dynamic parameters;

during calculation of minimal distance between respective strokes, a combination of at least two normalized dynamic parameters is chosen, of which a first describes at least stylus position in dependence on time, so that strokewise a verification measure is obtained indicating similarity of the sample character string to the other sample character string; and wherein for the reference set REF={REF$_1$, . . . , REF$_n$} a form matrix of the form:

$$\text{Form} = \begin{bmatrix} m\_\text{form}_{11} & m\_\text{form}_{12} & m\_\text{form}_{1n} \\ m\_\text{form}_{21} & & \\ m\_\text{form}_{n1} & & m\_\text{form}_{nn} \end{bmatrix}$$

and a motion matrix of the form:

$$\text{Bewegung} = \begin{bmatrix} m\_\text{bewe}_{11} & m\_\text{bewe}_{12} & m\_\text{bewe}_{1n} \\ m\_\text{bewe}_{21} & & \\ m\_\text{bewe}_{n1} & & m\_\text{bewe}_{nn} \end{bmatrix}$$

are formed for all REF$_i$ with REF$_j$, i,j=1 . . . n with $$m\_\text{form} = \sum_{i=1}^{n} ws_i * D(rs_i, ps_i),$$

as well as $$ws_i = \frac{1}{\text{mean\_Form\_}s_i * \text{std\_Form\_}s_i},$$

and $$m\_b_{ewe} = \sum_{i=1}^{n} m\_b_{ewe}(rs_i, ps_i)$$

$$g(i,j,k) = d(i,j,k) + \min \begin{bmatrix} g(i,j-1,k) \\ g(i-1,j-1,k) \\ g(i-1,j,k) \end{bmatrix},$$

for I=2 . . . I(K), j=2 . . . J(K) as a calculating rule for a verification measure within a stroke k, k=1 . . . K, and $$g(i,1,k) = d(i,1,k) + \min \begin{bmatrix} g(i-1,1,k) \\ g(i-1,j(k^*),k^*) \end{bmatrix}, k^* \in Pre(k),$$

for I=2 . . . I(K), j=2 . . . J(K) as a calculating rule for a verification measure at stroke borders with:

$$d(i,j,k) = w_1 \cdot d_1(i,j,k) + w_2 \cdot d_2(i,j,k)$$

$R(t) = [\text{PenUp/PenDown}, x(t), y(t), p(t), t]$ general feature vector $x,y$ locus parameter, $p$ pressure parameter, $t$ time $RN(t) = (zr(t), pr(t), vxr(t))$ feature vectors of a normalized reference signature $PN(t) = (zp(t), pp(t), vxp(t))$ feature vectors of the normalized sample signature $z(t) x(t) + I^*y(t)$;
$vx(t)$ speed in $x$ direction $R(t) = (rs_1; \ldots; rs_k)$ the stroke sequence in the reference signature $P(t) = (ps_1; \ldots; ps_m)$ the stroke sequence in the sample signature (with $m = K$ at first))

$m$ form  Verification measure for agreement in writing motion $m$ $b_{ewe}$  Verification measure for agreement of dynamic parameters mean\_Form\_$s_l$  a mean value of a form measure of stroke $l$ over an initial set of reference signatures mean\_Bewegung\_$s_l$  a mean value of a motion measure of stroke $l$ over an initial set of reference signatures std\_Form\_$s_l$  a standard deviation of the form measure of stroke $l$ over an initial set of reference signatures std\_Bewegung\_$s_l$  a standard deviation of the motion measure of stroke $l$ over an initial set of reference signatures $w_1$  weighting factor derived at least from std\_Form\_$si$ $w_2$  weighting factor derived at least from std\_Bewegung\_$s_l$ $Pre(k)$  the possible set of allowable precursor strokes to stroke $k$ $Pre(k) = \{k-1; k-3; k\text{Null}; k\text{Pseudo}\}, k = 1 \ldots K$ stroke index in the reference $k$Null  index of "missing strokes"
$k$Pseudo  index of "superfluous strokes"

$(Pre(1) = \{k\text{Null}; k\text{Pseudo}\}$ from which a following minimum is further formed:
[MIN,index]=min (sum((Form.*Form).*(Bewegung.*Bewegung)))

where ".*" denotes element-element multiplication whereby the reference signature occurs:
Ref={O$_{index}$}.

2. A method according to claim 1 in which at least one of the at least two normalized dynamic parameters which are combined is multiplicatively weighted with a weighting factor.

3. A method according to claim 1 in which one of the normalized dynamic parameters being combined is pressure used in writing.

4. A method according to claim 1 in which one of the normalized dynamic parameters being combined is writing speed.

5. A method according to claim 1, in which for the reference set it is investigated with what degree of precision the dynamic parameters are reproduced in relation to individual strokes of the set, and in which a weighting factor is assigned per stroke in dependence on accuracy of reproduction in such a manner that strokes having great reproductive accuracy are strongly weighted and strokes having little reproductive accuracy are weakly weighted.

6. A method according to claim 5 in which a square of a verification measure is divided by a square of a standard deviation of a stroke being examined in relation to the reference set.

7. A method according to claim 6, in which the verification measure is divided by the standard deviation of the stroke being examined, in relation to the reference set, multiplied by a mean value of the verification measure formed from the corresponding stroke within the reference set.

8. A method according to claim 1 for determining two reference signatures from the reference set with $REF_{index}=REF_1$ as a desired first reference signature and:

$O_{Min}=\{O_i\}$, $I\epsilon[1,\ldots,n]$ a partial set of sample signatures having small values in relation to $O_{ref1}$, as well as $O_{Max}=\{O_i\}$, $I\epsilon[1,\ldots,n]$ a partial set of sample signatures having large values in relation to $O_{Ref1}$, $O_{Mean}=\{O_i\}$, $I\epsilon[1,\ldots,n]$ a partial set of sample signatures having medium values in relation to $O_{Ref1}$.

and wherein a following condition holds:

$$\|O_{Min}\|\epsilon\left[\lfloor\frac{n}{2}\rfloor\pm\frac{num}{2}\right]\wedge\|O_{Max}\|\epsilon\left[\lfloor\frac{n}{2}\rfloor\pm\frac{num}{2}\right],$$

$$num=f(n)$$

it then follows that $[MIN,index2]=min,$ and $(sum[((Form.*Form).*(Bewegung.*Bewegung))]_{(index1,|OMax|_1)})$ with $[((Form.*Form).*(Bewegung.*Bewegung))]_{(index1,|OMax|_1)}$ a subcolumn belonging to $\|OMax\|$ in relation to $O_{Ref1}$, and index2 is an index of that of the second reference signature that is most similar to all the ones from this group, and wherein $O_{Ref2}=O_{index2}$, and thus $Ref=\{O_{Ref1}, O_{Ref2}\}$.

* * * * *